US009773238B2

(12) United States Patent
Bigus

(10) Patent No.: US 9,773,238 B2
(45) Date of Patent: Sep. 26, 2017

(54) VEHICLE-BASED ORDER ENTRY AND PROCESSING MECHANISM

(75) Inventor: Joseph Phillip Bigus, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1298 days.

(21) Appl. No.: 09/238,821

(22) Filed: Jan. 28, 1999

(65) Prior Publication Data

US 2002/0013730 A1 Jan. 31, 2002

(51) Int. Cl.
*H04L 29/06* (2006.01)
*G06Q 50/12* (2012.01)
*G06Q 20/32* (2012.01)
*G06Q 20/12* (2012.01)
*G06Q 30/06* (2012.01)
*G07F 7/00* (2006.01)

(52) U.S. Cl.
CPC .......... *G06Q 20/322* (2013.01); *G06Q 20/12* (2013.01); *G06Q 30/06* (2013.01); *G06Q 50/12* (2013.01); *G07F 7/00* (2013.01)

(58) Field of Classification Search
None
See application file for complete search history.

(56) References Cited

U.S. PATENT DOCUMENTS

| 4,415,065 A | 11/1983 | Sandstedt ................. 186/39 |
| 4,530,067 A | 7/1985 | Dorr ........................ 364/900 |
| 4,553,222 A | 11/1985 | Kurland et al. ............. 364/900 |
| 4,569,421 A | 2/1986 | Sandstedt ................. 186/39 |
| 4,638,312 A | 1/1987 | Quinn et al. ............. 340/825.35 |
| 4,973,952 A | 11/1990 | Malec et al. ............. 340/825.35 |
| 5,003,472 A | 3/1991 | Perrill et al. ............. 364/401 |
| 5,202,825 A | 4/1993 | Miller et al. ............. 364/405 |
| 5,504,589 A * | 4/1996 | Montague et al. ........... 358/403 |
| 5,553,312 A | 9/1996 | Gattey et al. ............. 455/11.1 |
| 5,590,407 A * | 12/1996 | Ishikawa et al. ............. 455/66 |
| 5,664,948 A | 9/1997 | Dimitriadis et al. ..... 434/307 R |
| 5,794,116 A | 8/1998 | Matsuda et al. ............. 455/5.1 |
| 5,845,263 A * | 12/1998 | Camaisa et al. ............. 705/27 |
| 5,912,743 A * | 6/1999 | Kinebuchi ........... G06Q 10/087 358/442 |
| 5,969,968 A * | 10/1999 | Pentel ............................ 705/26 |
| 5,999,934 A * | 12/1999 | Cohen et al. ................ 707/100 |
| 6,014,569 A * | 1/2000 | Bottum ........................ 455/466 |
| 6,256,129 B1 * | 7/2001 | Kim et al. ..................... 359/159 |
| 6,522,875 B1 * | 2/2003 | Dowling ............. H04L 12/1859 340/995.1 |

OTHER PUBLICATIONS

S. Shankland, "Sun uncorks Jini, names partners," Staff Writer, CNET News.com, Jan. 25, 1999.

(Continued)

*Primary Examiner* — Olabode Akintola
(74) *Attorney, Agent, or Firm* — Roy W. Truelson; Steven W. Roth

(57) ABSTRACT

The present invention uses an order processing server to transmit an electronic menu to a customer. When a vehicle comes within range of the server's transceiver, the menu is received by the particular customer device, and the order is formulated and transmitted back to the server.

34 Claims, 11 Drawing Sheets

(56) References Cited

OTHER PUBLICATIONS

Abstract for JAPIO 97-097290, "Order Menu Data Processor." Y. Kawamata.
Abstract for JAPIO 97-069129, "Shopping System," M Oguri.
Abstract for JAPIO 96-315046, "Order Input System," F. Inda.
Abstract for JAPIO 96-241467, "Information Device," 0. Imagawa et al.
Abstract for JAPIO 96-055161, "Article Ordering System," K. Izumi.
Abstract for JAPIO 96-016666, "Radio Order Management System," Y. Azuma.
Abstract for JAPIO 94-209318, "Radio Ordering System," S. Nakajima.
Abstract for JAPIO 94-110907, "Remote Shop System for Take-Out Lunch," T. Akiyama et al.
Abstract for JAPIO 91-009467, "Radio Ordering System," H. Matsumoto.
Abstract for JAPIO 87-193432, "Radio Ordering System," S. Nakajima.
Abstract for WPAT 75-E9211W/19, "Remote Order Placing Installation for Restaurants—Comprises Order Input System with Item Analysis and Control Slip Printing."
Michael D. Ellis, et al., "Electronic Television Program Guide Schedule System and Method with Remote Product Ordering," Canadian Application No. 2,413,051, filed Apr. 24, 1996.

\* cited by examiner

```
<?xml version="1.0" encoding="UTF-8"?>
<!--    menu.dtd.    -->
```
800—`<!ELEMENT MENU (TIMESTAMP, MEALTYPE+) >`
801—`<!ELEMENT ORDER (TIMESTAMP, VEHID, PYMT, MEALCAT*) >`
```
<!-- ********************** -->
```
802—`<!ELEMENT VEHID (#PCDATA) >`
803—`<!ELEMENT PYMT (#PCDATA) >`
```
<!-- ********************** -->
```
805—`<!ELEMENT TIMESTAMP (DATE, TIME) >`
807—`<!ELEMENT DATE (#PCDATA) >`
809—`<!ELEMENT TIME (#PCDATA) >`
```
<!-- ********************** -->
```
811—`<!ELEMENT MEALTYPE (MEALCAT+) >`
813—`<!ATTLIST MEALTYPE name CDATA #REQUIRED >`
```
<!-- ********************** -->
```
815—`<!ELEMENT MEALCAT (ITEMTYPE*, ITEM*) >`
817—`<!ATTLIST MEALCAT category CDATA #REQUIRED >`
819—`<!ELEMENT ITEMTYPE (ITEM+) >`
821—`<!ATTLIST ITEMTYPE type CDATA #REQUIRED >`
```
<!-- ********************** -->
```
823—`<!ELEMENT ITEM EMPTY >`
825—`<!ATTLIST ITEM type CDATA #REQUIRED`
                    `size CDATA #REQUIRED`
                    `price CDATA #REQUIRED`
                    `quantity CDATA #IMPLIED >`

FIG. 8

```
<?xml version="1.0"?>
<!-- Breakfast Menu -->
<!-- ABC Restaurant -->
<!-- Generated: 01/28/99 06:00:00 -->
<!DOCTYPE MENU SYSTEM "menu.dtd">
<MENU>
  <TIMESTAMP>
    <DATE>"JANUARY 28, 1999"</DATE>
    <TIME>"07:53:22"</TIME>
  </TIMESTAMP>
  <MEALTYPE name="BREAKFAST">
    <MEALCAT category="FOOD">
      <ITEMTYPE type="MEAL">
        <ITEM type="LITEMEAL" size="N/A" price="$2.89"></ITEM>
        <ITEM type="HUNGRYMEAL" size="N/A" price="$4.89"></ITEM>
      </ITEMTYPE>
      <ITEMTYPE type="SANDWICH">
        <ITEM type="SAUSAGE-EGG" size="N/A" price="$1.89"></ITEM>
        <ITEM type="BACON-EGG" size="N/A" price="$1.89"></ITEM>
        <ITEM type="HAM-EGG" size="N/A" price="$1.89"></ITEM>
      </ITEMTYPE>
      <ITEMTYPE type="SIDEORDER">
        <ITEM type="HASHBROWNS" size="S" price="$0.89"></ITEM>
        <ITEM type="HASHBROWNS" size="M" price="$1.09"></ITEM>
        <ITEM type="HASHBROWNS" size="L" price="$1.29"></ITEM>
        <ITEM type="MUFFIN" size="N/A" price="$1.39"></ITEM>
        <ITEM type="ROLL" size="N/A" price="$1.39"></ITEM>
      </ITEMTYPE>
    </MEALCAT>
    <MEALCAT category="DRINK">
      <ITEM type="MILK" size="N/A" price="$0.89"></ITEM>
      <ITEM type="COFFEE" size="R" price="$1.09"></ITEM>
      <ITEM type="COFFEE" size="L" price="$1.29"></ITEM>
      <ITEM type="ORANGEJUICE" size="N/A" price="$0.89"></ITEM>
      <ITEM type="APPLEJUICE" size="N/A" price="$0.89"></ITEM>
    </MEALCAT>
  </MEALTYPE>
</MENU>
```

FIG. 9

```
1002 ─── <?xml version="1.0"?>
1005 ─── <!DOCTYPE ORDER SYSTEM "menu.dtd">
1007 ─── <ORDER>
          <TIMESTAMP>
1010 ─┤    <DATE> "JANUARY 28, 1999"</DATE>
          <TIME> "07:59:22"</TIME>
          </TIMESTAMP>
1015 ─── <VEHID>97,TAN,FORD,TRUCK,2175</VEHID>
1017 ─── <PYMT>VISA,1234123412341234</PYMT>
          <MEALCAT category="FOOD">
          <ITEMTYPE type="SANDWICH">
1020 ─── <ITEM type="SAUSAGE-EGG" size="N/A" price="$1.89" quantity="2"></ITEM>
          </ITEMTYPE>
          <ITEMTYPE type="SIDEORDER">
1025 ─── <ITEM type="HASHBROWNS" size="S" price="$0.89" quantity="1"></ITEM>
          </ITEMTYPE>
          </MEALCAT>
          <MEALCAT category="DRINK">
1030 ─── <ITEM type="MILK" size="N/A" price="$0.89" quantity="1"></ITEM>
          </MEALCAT>
          </ORDER>
```

FIG. 10

VEHICLE-BASED ORDER ENTRY AND PROCESSING MECHANISM

FIELD OF THE INVENTION

The present invention relates to data processing systems. More particularly, the present invention relates to remote order entry and processing.

BACKGROUND OF THE INVENTION

The phrase "modern conveniences" has been uttered in American society for decades. One of the earliest conveniences was the service concept of "eating out." Here, we mean the notion of purchasing a meal in a restaurant instead of preparing a meal in one's home. The appeal to this particular service is based on several possible advantages, including a specialized restaurant environment, specialized food (e.g., French Cuisine), or simply elimination of the effort associated with preparing a meal.

Other conveniences have been brought on by the introduction of new technologies. For instance, the proliferation of affordable automobiles in the early 1900's brought about a significant change to the American lifestyle. Middle class America became an extremely mobile society, with daily travel of several miles becoming commonplace. By the 1950s, there was a perceived need to integrate the automobile into the restaurant experience. This patent pertains to this automobile-restaurant integration.

Perhaps the earliest attempt at integration was the "car hop" concept. Restaurants were designed to have a kitchen and a large car port. The car port would typically be large enough to accommodate several cars. Customers would enter the car port in their vehicles and be waited on by waitpersons known as "car hops." While the car hop arrangement provided an enjoyable and often fun experience, it was quite inefficient. The car ports were limited in size, and providing service to each individual car took a fair bit of time. One technologic improvement to the car hop arrangement was the use of "service phones." Service phones were used by customers to place orders directly from their vehicles, meaning that car hops were no longer responsible for taking customer orders, but were instead only responsible for delivering the food needed to fill the orders. However, while service phones helped, the physical limitations of the car port and the effort needed to delivery the food continued to make the car hop arrangement inefficient.

Fast food restaurants came on the scene at about the same time as car hop restaurants. While early fast food restaurants were not a direct attempt to integrate the concept of the automobile with that of the restaurant, the notion of "fast" food did not have much meaning in the pre-automobile era. After all, it did not really matter how "fast" the food could be prepared if transportation to and from the restaurant was impractical. Even still there was the perceived need to better integrate the concepts of the automobile and fast food. A well-known solution to this need for integration is the "drive-up window." While no one can be sure where and when the first drive-up window was used, drive-up windows became fairly common in the 1970's and 1980's; and today, it is difficult to find a fast food restaurant without a drive-up window.

While drive-up windows currently represent the greatest degree of automobile-restaurant integration, present solutions are extremely inefficient. The order processing used in today's drive-up window arrangements is basically the same as that used inside the fast food restaurant itself. Customers wait in line, determine what they want to order, and present their order to the teller. A menu is displayed for review by the customers. The customers then determine what to order and present their order to the teller when asked.

While this line-oriented process works well inside the restaurant, it is exceedingly inefficient outside the restaurant in the drive-up window line. Because of the size of automobiles and the distance between each automobile, only one customer is able to see the menu at a time. Thus, customers loose the opportunity to formulate their order while waiting in line. This problem is exacerbated by the fact that the drive-up menu and the ordering position are typically located at the same place, which means that the customer is asked to formulate their order and present it to the teller at the same time. This recurring scenario causes several problems. First, the customer is frustrated and annoyed because they are being asked to do two things at once. Second, the customer will often need to ask for more time, which costs the restaurant money. Third, individuals in cars behind the ordering car become annoyed and frustrated with the delay and in some cases communicate their frustration to the ordering car, resulting in embarrassment and further annoyance and anger.

Yet another problem with today's drive-up window process is the two-way speaker system that is typically used to aurally exchange orders and information between the automobile and the teller. Often times, traffic and engine noise make communicating a difficult proposition, which of course causes additional frustration and annoyance.

Without an improved mechanism for processing automobile orders, the fast food industry will continue to annoy and frustrate customers and waste valuable time and money.

SUMMARY OF THE INVENTION

The preferred embodiment of the present invention uses an order processing server to transmit an electronic menu to a customer's hand held device or to a computer located within a customer's automobile. The server repeatedly transmits the menu, and when a vehicle comes within range of the server's transceiver, the menu is received by the particular customer device. The order is then formulated and transmitted back to the server.

These and other features of the present invention will be explained in further detail in the text associated with the following drawings.

BRIEF DESCRIPTION OF THE DRAWINGS

FIG. 8 is a diagram showing a document type definition for the MDML language.

FIGS. 9 and 10 are example MDML documents that are used in the Detailed Description to help explain the inner-workings of the preferred embodiment.

DETAILED DESCRIPTION

Server 100

Figure 1A:
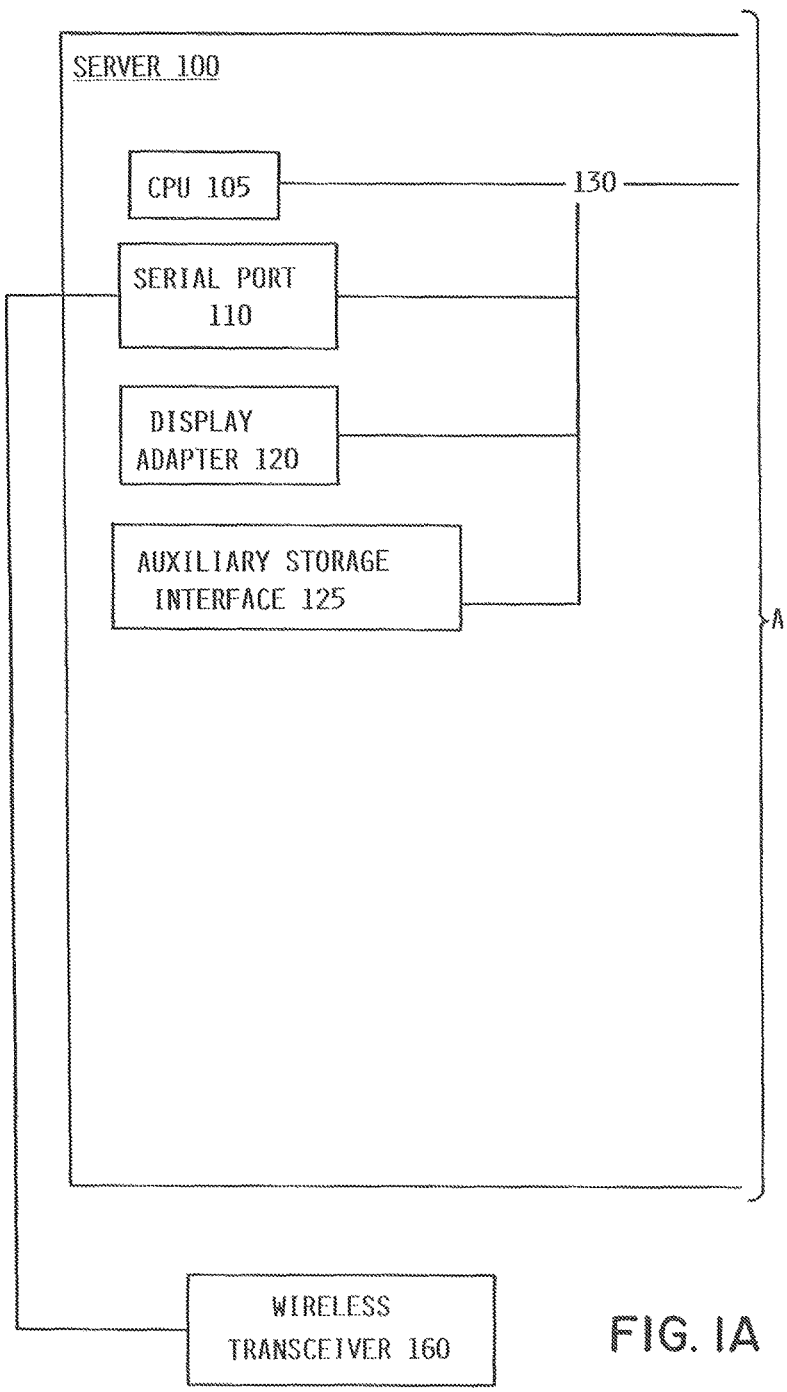
FIG. 1 is a block diagram of the order processing server that is used in the preferred embodiment of the present invention.
Figure 1B:
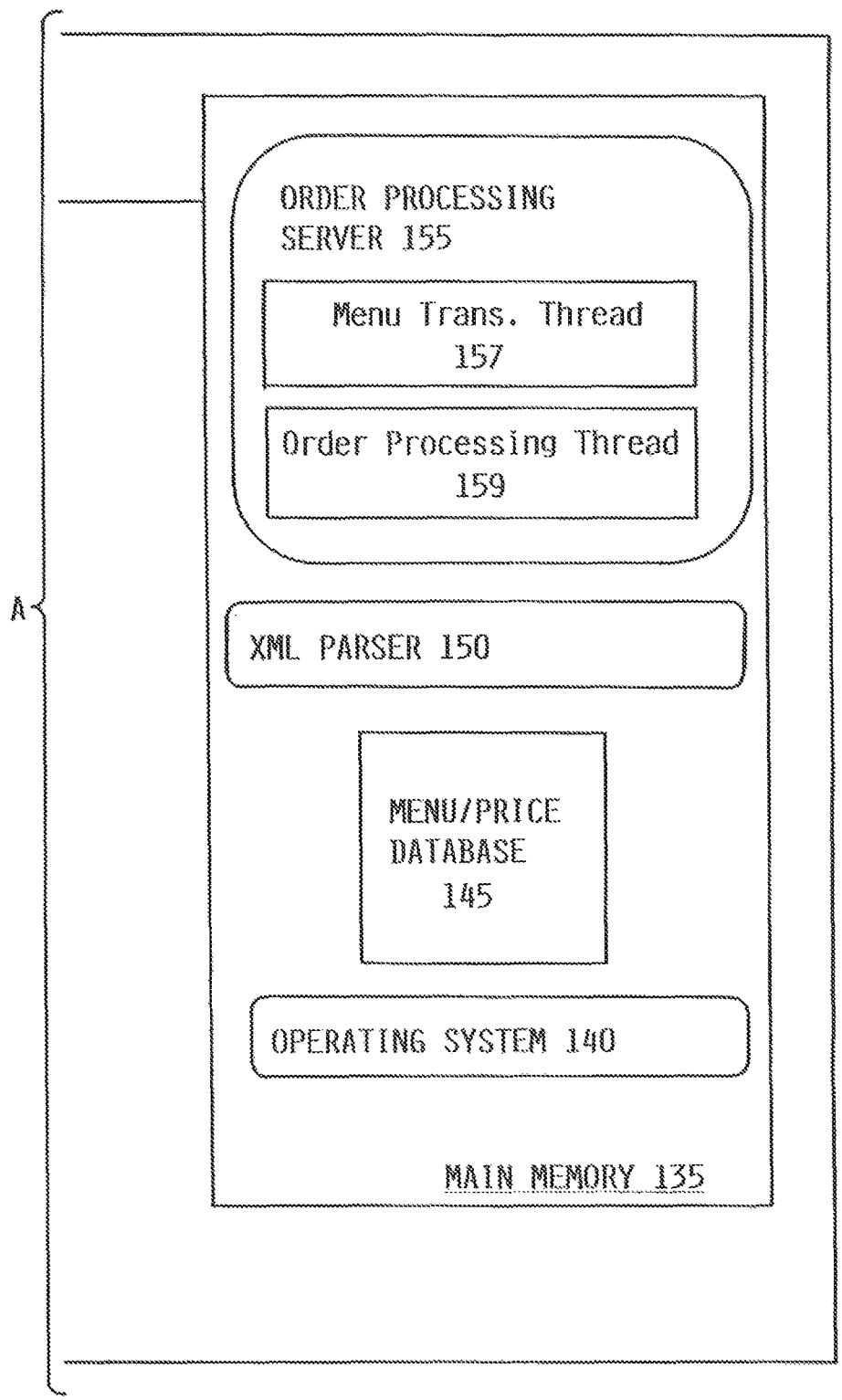
Figure 2:
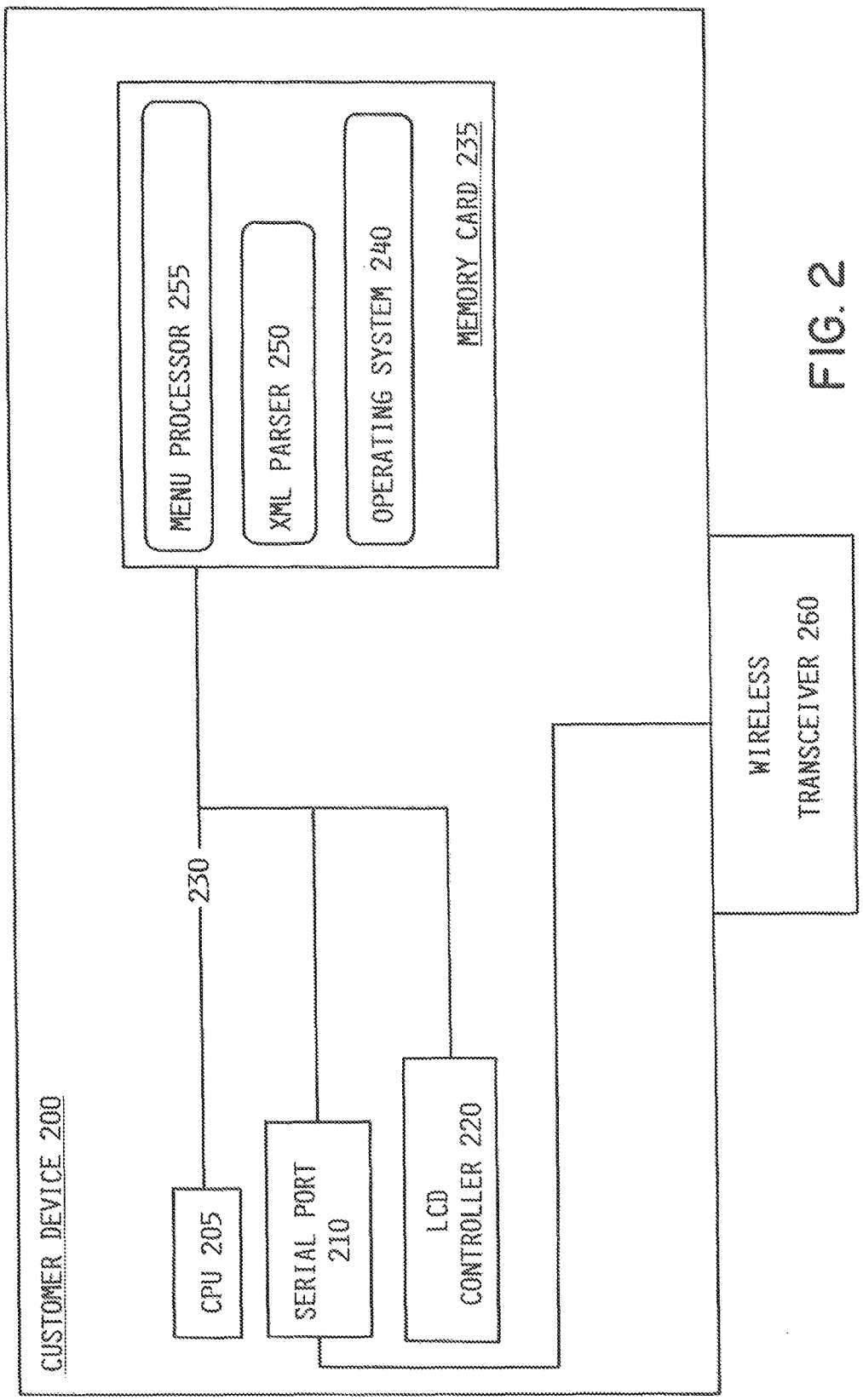
FIG. 2 is a block diagram of the customer device that is used in the preferred embodiment of the present invention.

Turning now to the drawings, FIG. 1 is a block diagram of the server computer system of the preferred embodiment. Server 100 is an enhanced IBM Personal Computer 300PL; however, it should be understood that the present invention is not limited to any one make or type of computer system. As shown, Server 100 comprises Central Processing Unit (CPU) 105, which is connected to Serial Port 110, Display Adapter 120, Auxiliary Storage Adapter 125, and Main Memory 135. These system components are interconnected through the use of System Bus 130. As shown, Serial Port 110 is also connected to Wireless Transceiver 160.

CPU 105 is a 233 MHz. Pentium Processor made by Intel Corporation. However, it should be understood that the present invention is not limited to any one make of processor and that the invention could be practiced using some other type of a processor, such as a co-processor or an auxiliary processor. Auxiliary Storage Adapter 125 is used to connect mass storage devices (such as a Hard Disk Drive) to Server 100.

Main Memory 135 contains Operating System 140, Menu/Price Database 145, XML Parser 150, and Order Processing Server 155. Menu Transmission Thread 157 and Order Processing Thread 159 are different threads running under the task of Order Processing Server 155.

Operating System 140 is Windows NT, which is a well-known multi-tasking and multi-threading operating system offered and sold by Microsoft Corporation. As its name suggests, Menu/Price Database 145 is used to store menu and price information. This information is used by Menu Transmission Thread 157. XML Parser 150 can be one of any of the available XML Parsers available for the Windows NT Operating System. Order Processing Server 155 and its threads, Menu Transmission Thread 157 and Order Processing Thread 159, are explained using FIGS. 3 and 5-10 and the associated text.

Server 100 utilizes well-known virtual addressing mechanisms that allow its programs to behave as if they have access to a single, large storage entity (i.e., instead of access to multiple, smaller storage entities such as Main Memory 135 and a HDD). Therefore, while certain mechanisms and constructs are shown to reside in Main Memory 135, those skilled in the art will recognize that these programs are not necessarily all completely contained in Main Memory 135 at the same time. For example, portions of Operating System 140 will reside in Main Memory 135 while executing on CPU 105, but will at other times reside on an attached HDD. Thus, the term memory is used herein to generically refer to storage that spans the entire virtual address space of a computer system, irrespective of the particular physical devices that make up that storage.

Display adapter 120 is used to directly connect a display device to computer system 100. Serial Port 110 is used to connect Server 100 to other devices such as Wireless Transceiver 160. Wireless Transceiver 160 is used to continually transmit a menu in XML format as a wireless transmission. This aspect of the preferred embodiment is described in the text associated with FIG. 4. The wireless protocol used in the preferred embodiment is that known in the industry as Bluetooth, which is a wireless protocol standard that is being used by various companies within the industry. However, it should be understood that other short-range wireless connectivity standards could be used such as that promulgated by the InfraRed Data Association (IRDA). Another important point to note is that the range of the wireless transmission must be closely tailored to the environment at issue to avoid reception of the wireless transmission by non-customers. For example the range contemplated in the Bluetooth protocol is ten (10) meters.

Two hardware embodiments of Customer Device 200 will now be presented. The term Customer Device should be understood in the specification and in the claims to refer to either hardware environment and any legal equivalents thereof. For example, Customer Device 200 could be a laptop computer system or be imbedded into any one of a number of portable devices such as cellular phones or other communication devices.

Customer Device 200—PALM III

The first hardware embodiment of Customer Device 200 is a PALM III Personal Digital Assistant (PDA) device that is marketed by 3COM Incorporated; however, it should be understood that any other similarly configured PDA could be used. As shown, Customer Device 200 comprises Central Processing Unit (CPU) 205, which is connected to Serial Port 210, LCD Controller 220, and Memory Card 235. These system components are interconnected through the use of System Bus 230. As shown, Serial Port 210 is also connected to Wireless Transceiver 260.

CPU 205 is a 68000 series embedded processor that is manufactured by Motorolla Corporation. However, it should be understood that the present invention is not limited to any one make of processor and that the invention could be practiced using some other type of a processor, such as a co-processor or an auxiliary processor.

Main Memory 235 contains Operating System 240, XML Parser 250 and Menu Processor 255. Operating System 240 is the operating system known in the industry as PALM OS, which is offered and sold by 3COM Incorporated along with its PALM III PDA device. As with XML Parser 150, XML Parser 250 can be one of any of the available XML Parsers available for the PALM OS operating system.

LCD Controller 220 is used to render bit-oriented images on the display of Customer Device 200 (i.e., the Auto PC). Serial Port 210 is used to connect Server 200 to other devices such as Wireless Transceiver 260. Wireless Transceiver 260 is used to send and receive wireless transmissions in the form of menus, orders, and other information to and from Server 100 (see FIGS. 3-5). In particular Wireless Transceiver 260 is capable of sending and receiving transmissions using the Bluetooth standard discussed above. Wireless Transceiver 260 is also capable of sending wireless transmissions using the IRDA standard discussed above.

Customer Device 200—AutoPC

The second hardware embodiment of Customer Device 200 is a AutoPC automobile computer device that is marketed by Clarion Corporation. However, it should be understood that any other similarly configured automobile computer could be used. As shown, Customer Device 200 comprises Central Processing Unit (CPU) 205, which is connected to LCD Controller 220 and Memory Card 235. Customer Device 200 has also been enhanced to include Serial Port 210 and Wireless Transceiver 260, which are components that are not customarily available in a standard AutoPC. As shown, Serial Port 210 is also connected to Wireless Transceiver 260.

CPU 205 is a Hitachi SH3 embedded processor. However, it should be understood that the present invention is not limited to any one make or type of imbedded processor.

Main Memory 235 contains Operating System 240, XML Parser 250 and Menu Processor 255. Operating System 240 is the operating system known in the industry as Windows CE, which is offered and sold by Microsoft Corporation. As with XML Parser 150, XML Parser 250 can be one of any of the available XML Parsers available for the Windows CE operating system. Order Processing Server 255 and its threads, Menu Transmission Thread 257 and Order Processing Thread 259, are explained using FIGS. 4 and 6-10 and the associated text.

LCD Controller 220 is used to render bit-oriented images on the display of Customer Device 200 (i.e., the PALM III). Serial Port 210 is used to connect Server 200 to other devices such as Wireless Transceiver 260. Wireless Transceiver 260 is used to send and receive wireless transmissions in the form of menus, orders, and other information to and from Server 100 (see FIGS. 3-5). In particular Wireless Transceiver 260 is capable of sending and receiving transmissions using the Bluetooth standard discussed above. Wireless Transceiver 260 is also capable of sending wireless transmissions using the IRDA standard discussed above.

As a final preliminary matter, it is important to note that while the present invention has been (and will continue to be) described in the context of fully functional servers and customer devices, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media, such as floppy disks, hard disk drives, and CD ROMs and transmission type media, such as digital and analog communications links including infrared communication links. It should also be noted that while the mechanisms of the present invention are shown to reside on different computer systems, these mechanisms would likely be distributed as a package on a single instance of signal bearing media.

Figure 3:
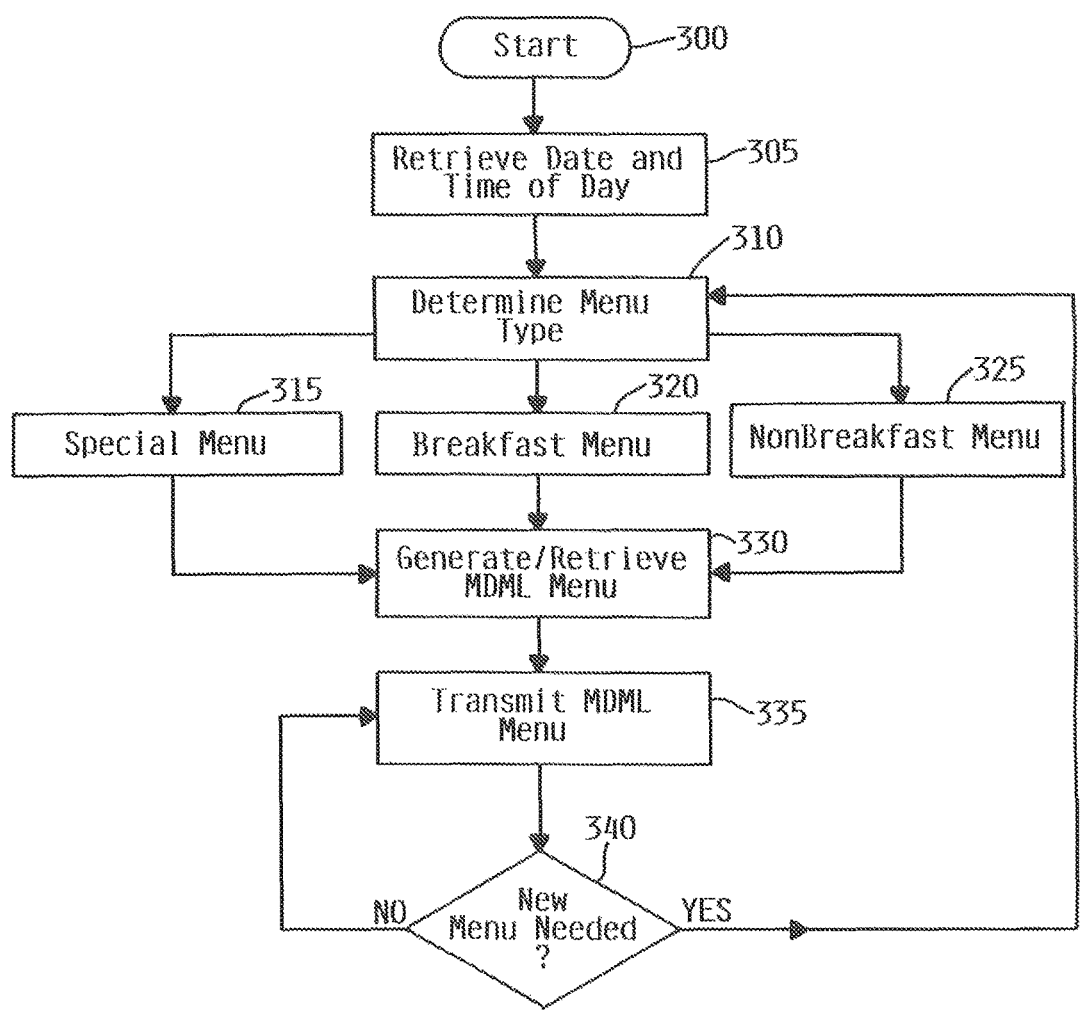
FIG. 3 shows the steps used to carry out the processing of menu transmission thread of the preferred embodiment.

As stated, FIG. 3 shows the steps used to carry out the menu transmission thread of the preferred embodiment. Menu Transmission Thread 157 starts its processing in block 300 and then proceeds to retrieve the date and time of day {block 305}. Menu Transmission Thread 157 then uses the retrieved date and time of day to determine the appropriate menu type {block 310}. As shown there are three types of menus used in preferred embodiment, a Special Menu {block 315}, a Breakfast Menu {block 320}, and a Non-Breakfast Menu {block 325}. The appropriate menu is selected based on time of day, available quantities of menu items, and/or the existence of a "special." The date is used to determine whether any Special Menu exists (e.g., because of an advertised promotion) and the time of day is used to determine whether the Breakfast Menu or the NonBreakfast Menu should be used. (The menu structure used in the preferred embodiment is presented in FIGS. 6 and 7 and the associated text.)

Figure 6:
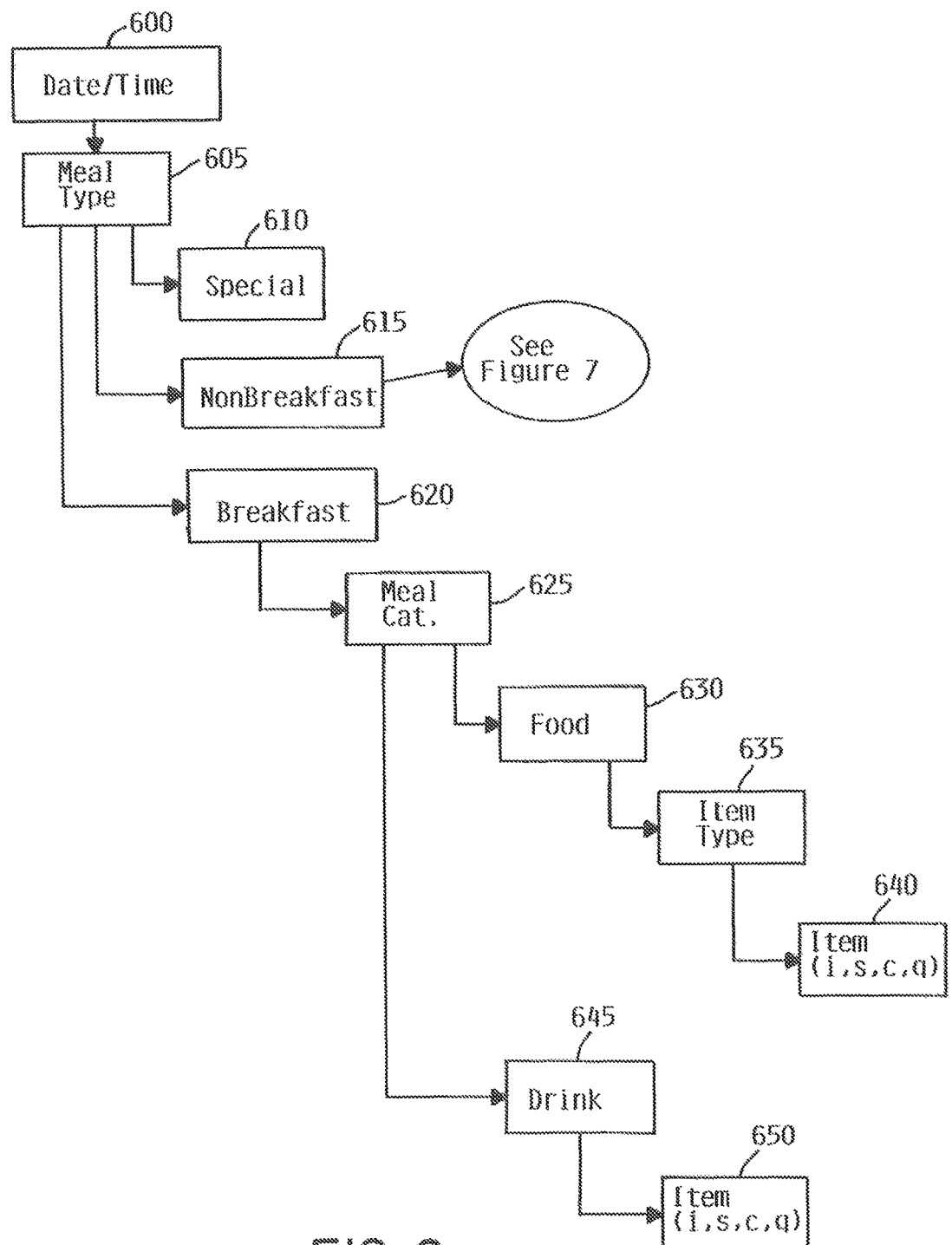
FIGS. 6 and 7 are hierarchical diagrams showing the menu structure of the preferred embodiment.

Once determined, the appropriate menu is either generated anew or retrieved from Menu/Price database 145. The meta language used in the preferred embodiment is called Menu Definition Markup Language (MDML), which is an extension of the well known eXtensible Markup Language (XML). The document entitled *Extensible Markup Language* (XML), Feb. 10, 1998, which is the most current specification for XML available at the time of filing, is hereby incorporated by reference. FIG. 6, which shows an example MDML menu, is used later in this patent to further explain the benefits and advantages of the present invention as illustrated by the preferred embodiment.

After Menu Transmission Thread 157 retrieves or generates the MDML menu, Menu Transmission Thread 157 transmits the MDML menu in block 335. Menu Transmission Thread 157 then determines if generation or retrieval of a new menu type is necessary {block 340}. This is done by again checking the date and time of day and by determining whether supplies of a particular menu item have been exhausted (not shown). If a new menu is not needed, Menu Transmission Thread 157 transmits the MDML menu again {block 335}, and again determines whether a new menu is needed {block 340}. Menu Transmission Thread 157 continues to loop in this manner until it determines that a new menu type is necessary {block 340}. When Menu Transmission Thread 157 determines that a new type of menu is necessary, it proceeds to make the selection and generate or retrieve the MDML menu as has been described in the text accompanying blocks 310 through 330.

Figure 4:
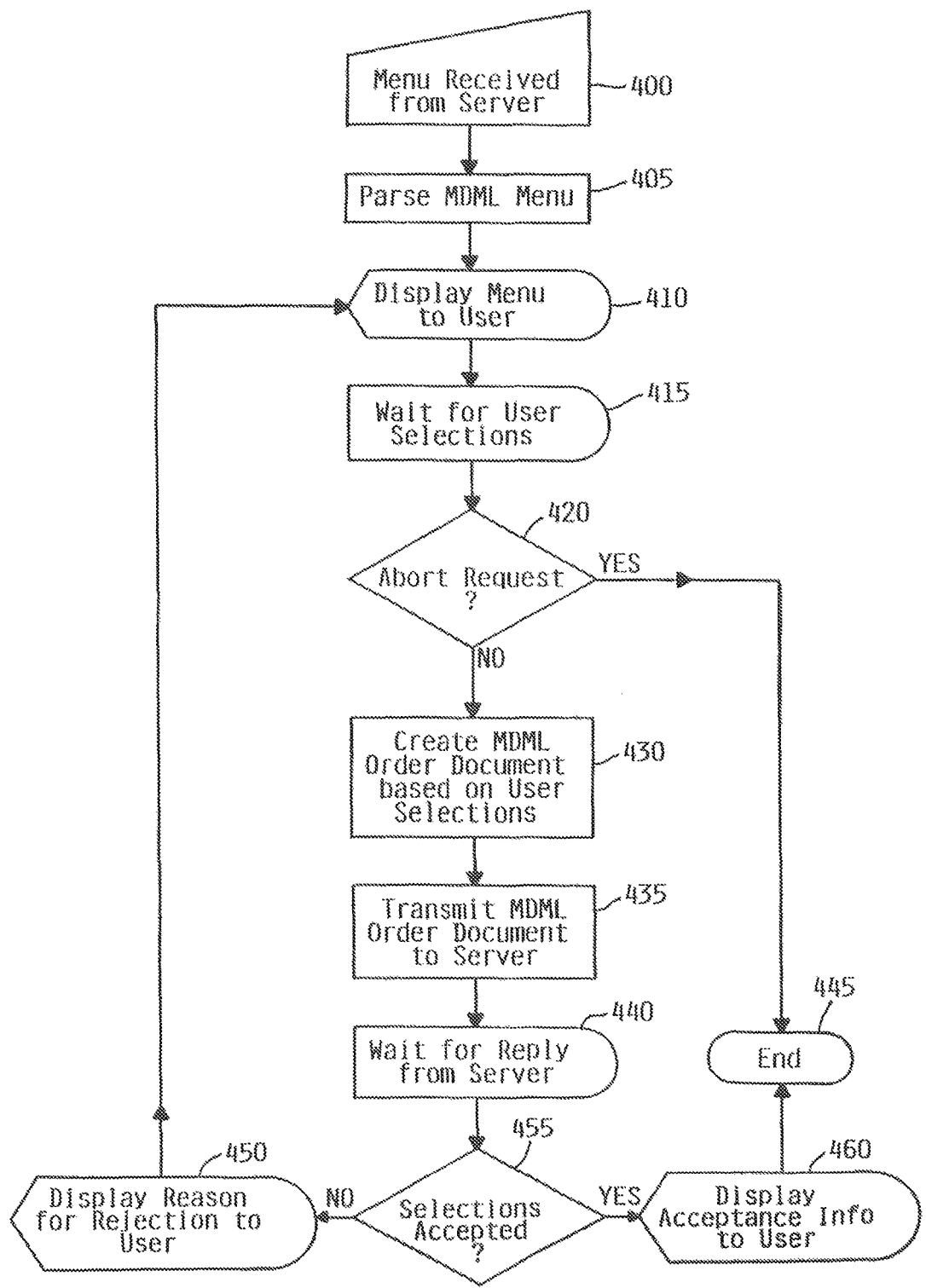
FIG. 4 shows the steps used to carry out the processing of the Menu Processor of the preferred embodiment.

FIG. 4 shows the steps used to carry out the processing of Menu Processor 255 of the preferred embodiment. As described above, Customer Device 200 receives transmission of the MDML menu {see block 335 of FIG. 3} when it comes within range of the signal transmitted by Wireless Transceiver 160. This occurs in block 400. Menu Processor 255 then parses the MDML menu using XML parser 250 {block 405}. Once parsed, the MDML menu is formatted and displayed to the user in the manner applicable to Customer Device 200 {block 410}. Menu Processor 255 then waits for the user's menu selections in block 415. Menu selections are made in the manner applicable to Customer Device 200. If a user abort request is received, Menu Processor 255 terminates execution in block 445.

If a user abort request is not received, Menu Processor 255 creates an MDML order document based on the user's selections {block 430} and transmits the order document to Server 100 {block 435}. FIG. 10, which shows an example MDML order document, is used later in this patent to further explain the benefits and advantages of the present invention as illustrated by the preferred embodiment. It should be noted that payment information and vehicle identification information are included in the order document of the preferred embodiment. In the preferred embodiment, credit card information is used as payment information and a randomly generated key along with the year, color, make (e.g., Ford), and type (e.g., truck) of vehicle are used as vehicle identification information. Those skilled in the art will appreciate that other techniques are equally applicable without loss of generality. For example payment information could specify that cash would be used at the time of pick up to pay for the order or could include an account number. Similarly, vehicle identification could be or include license and registration information or be information that identifies Customer Device 200.

After transmission of the order document, Menu Processor 255 waits for a reply from Server 100 {block 440}. When a reply is received, Menu Processor 255 determines whether the selections have been accepted or rejected {block 455}. (As will be described later in the discussion of FIG. 5, Menu Processor 255 is able to identify the correct reply based on returned vehicle identification information.) If the user's selections are rejected by Server 100, Menu Processor 255 displays the reasons for the rejection (as transmitted by Server 100) to the user {block 450}, and repeats display of the menu to the user {block 410}. Processing of blocks 415 through 440 then repeats as was described above. If the user's selections are accepted by Server 100, Menu Processor 255 displays the acceptance information (as transmitted by Server 100) to the user {block 460}, and terminates execution in block 445. In the preferred embodiment, acceptance information is information that instructs the user on how to pick up their order; however, other information could be transmitted.

Figure 5:
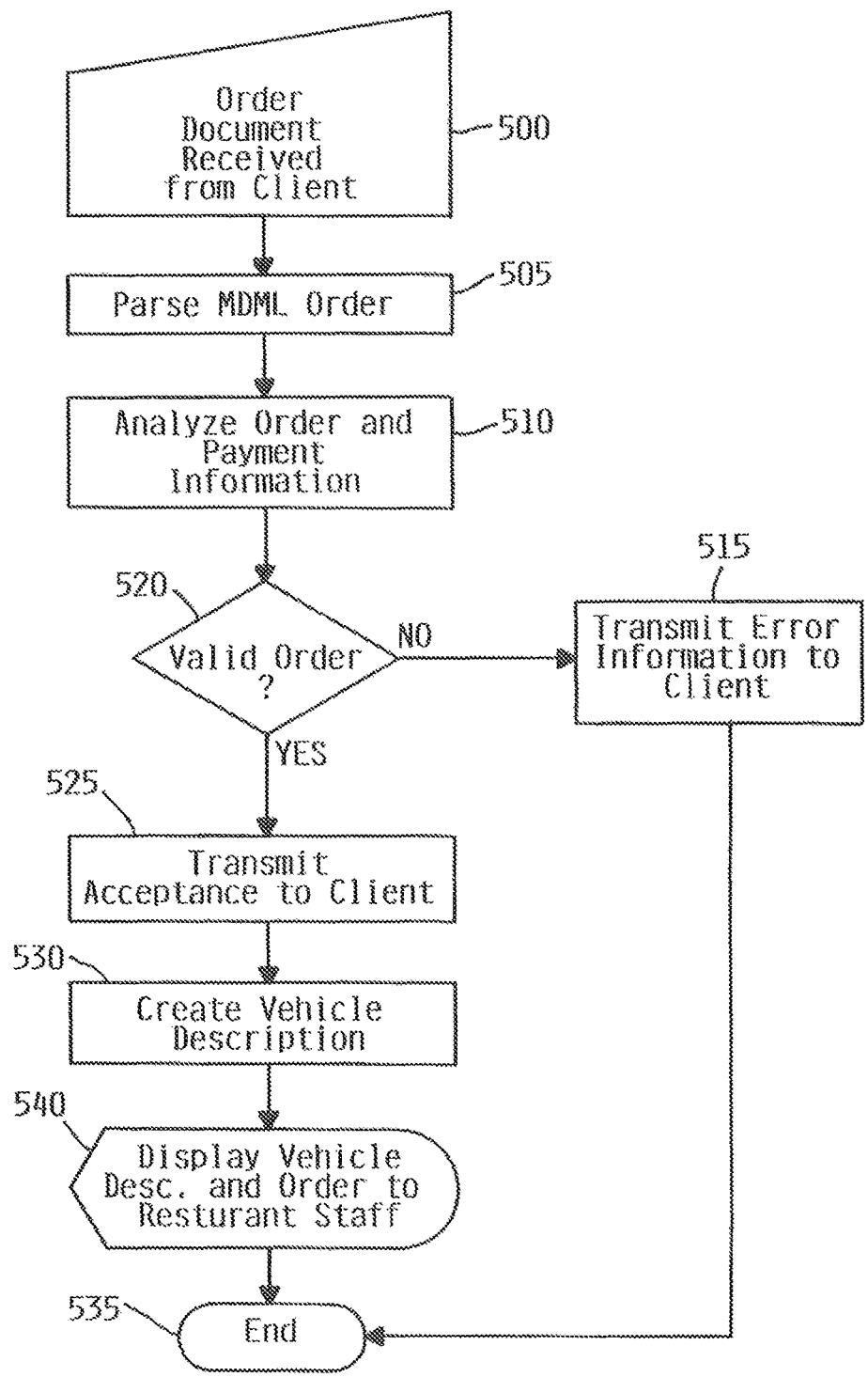
FIG. 5 shows the steps used to carry out the processing of the order processing thread of the preferred embodiment.

FIG. 5 shows the steps used to carry out the processing of Order Processing Thread 159 of the preferred embodiment. Order documents transmitted by Menu Processor 255, are received by Order Processing Thread 159 in block 500. Order Processing Thread 159 parses the received MDML order document using XML parser 150 {block 505}. Menu Processor 255 then analyzes the order and payment information contained in the order document {block 510} to determine whether the order as a whole is valid. An order may be invalid because payment information cannot be verified or because supplies of an ordered item have run out after menu transmission, or for some other reason. If an order is invalid {block 520}, Order Processing Thread 159 transmits the rejection information to the appropriate Customer Device 200 {block 515}. Note that the vehicle identification information contained in the order document is returned with the rejection so that the respective Customer Device 200s can determine whether a rejection notification is intended for their user. If an order is valid {block 520}, Order Processing Thread 159 transmits the acceptance information in block 525. Again, the vehicle identification information is used to ensure that the acceptance information is processed by the correct Customer Device 200. After transmitting the acceptance information, Order Processing Thread 159 creates a vehicle description from the vehicle identification information included in the order {block 530}, displays the vehicle description along with the order to the restaurant staff {block 540} and terminates execution in block 535.

FIG. 6 is a hierarchical diagram showing a portion of the menu structure of the preferred embodiment. Those skilled in the art will appreciate that other menu structures are possible within the spirit and scope of the present invention. Date and Time 600 are used in the manner of a three-way switch to determine the appropriate Meal Type 605. There are three meal types: Special 610, NonBreakfast 615, and Breakfast 620. Under Breakfast 620 there is provision for Meal Category 625, for which there are two possibilities, Food 630 and Drink 645. Beneath Food category 630, there is provision for Item Type 635, and beneath Item Type 635, there is provision for individual items. An example of an item type would be "sandwich" and an example of an item would be "sausage-egg sandwich." Included within Item are the name, size, cost, and quantity of the item. (Item quantity is present in the menu structure for order documents, not for initial presentation of a menu.)

Figure 7:
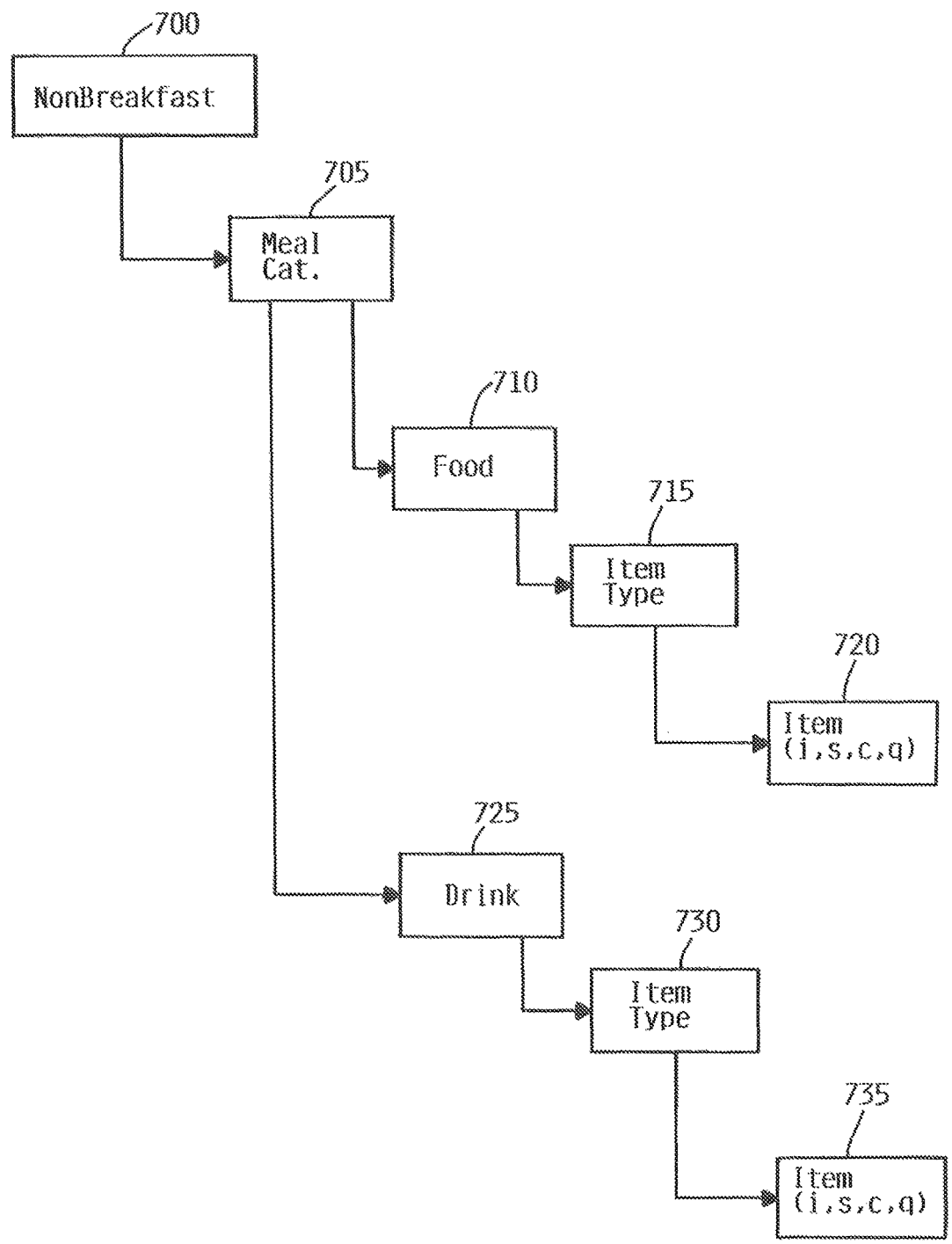

FIG. 7 is a hierarchical diagram showing the remaining portion of the menu structure of the preferred embodiment. In particular, FIG. 7 shows the NonBreakfast meal type in greater detail. Please refer to the discussion of FIG. 6 for details on the depicted structure.

Those skilled in the art understand that the XML language is extended through the use of what is referred to as a document type definition (DTD for short). A DTD is basically a set of definitions that provide information to an XML parser about how individual tags within the definitions are to be handled. One or more DTDs can be used to extend the capabilities of XML. In essence, the addition of each DTD to the base XML language creates a new tag-oriented language. As has been mentioned earlier, the mechanisms of the preferred embodiment utilize an extension to the XML language called the Menu Definition Markup Language (MDML).

FIG. 8 is a diagram showing the DTD for the MDML language. The DTD for MDML, named Menu.dtd, includes MENU element 800, which includes the parameters TIMESTAMP and MEALTYPE+; ORDER element 801, which includes the parameters TIMESTAMP, VEHID, PYMT, and MEALCAT*, VEHID element 802, which is parsed by Order Processing Thread 159 and Menu Processor 255; PYMT element 803, which is parsed by Order Processing Thread 159; TIMESTAMP element 805, which includes the parameters DATE and TIME; DATE element 807, which is parsed by Menu Processor 255 and Order Processing Thread 159; TIME element 809, which is parsed by Menu Processor 255 and Order Processing Thread 159; MEALTYPE element 811, which includes the MEALCAT+ parameter; MEALTYPE attribute list 813, which includes the required CDATA parameter "name;" MEALCAT element 815, which includes the ITEMTYPE* and ITEM* parameters; MEALCAT attribute list 817, which includes the required CDATA parameter "category;" ITEMTYPE element 819, which includes the ITEM+ parameter; ITEMTYPE attribute list 821, which includes the required CDATA parameter "type;" ITEM element 823, which does not include a parameter; ITEM attribute list 825, which includes the required CDATA parameters "type," "size," and "price," and the implied CDATA parameter "quantity."

FIGS. 9 and 10 are example MDML documents that are used in the Detailed Description to help explain the innerworkings of the preferred embodiment. FIG. 9 shows one example breakfast menu that conforms to the menu structure of the preferred embodiment. Breakfast menu 900 is one example of a MDML menu that could be generated/retrieved in block 330 of FIG. 3 and transmitted in block 335 of FIG. 3.

As with all well formed XML documents, breakfast menu 900 begins with the appropriate XML version statement (statement 902). Next, breakfast menu 900 includes DOCTYPE statement 905, which identifies the correct DTD to the XML parser (XML Parser 250 in this case). Again, the DTD contains the rules (called the grammar) which are used as the basis for parsing the document. What follows next is a series of tags. The reader should note that each tag (e.g., MENU 910 and TIMESTAMP 915) is somehow defined in the DTD for MDML (i.e., menu.dtd of FIG. 8).

MENU tag 910 signals the beginning of a menu. TIMESTAMP tag 915 denotes the beginning of a timestamp. A timestamp, as defined in the DTD, includes two fields, a date field and a time field. In menu 900 the date is set to be Jan. 28, 1999, and the time is set to be 7:53:22. MEALTYPE tag 925 is next, showing that the meal type is "breakfast." MEALCAT tags 930 and 942 are used to specify the two types of meal categories (i.e., FOOD and DRINK). Then, within each meal category, there is specified different item types (see for example ITEMTYPE tags 935 and 941). At the finest level of granularity the items themselves are specified. See for example ITEM tag grouping 940, where the different types of sandwiches are specified along with the cost of each. Note here that even though quantity is specified as a parameter in the menu structure definition of ITEM on FIGS. 6 and 7 is considered optional, given that it has no relevance in the context of the presentation of a menu. Note also that technically each tag construct is made up of start-end tag pairs (see for example end tag grouping 950, which match up with some of the earlier-explained start tags).

FIG. 10 shows one example of an order that conforms to the menu structure of the preferred embodiment. Order 1000 is one example of an MDML order that could be created in block 430 of FIG. 4 and transmitted in block 435 of FIG. 4.

Again as with all well formed XML documents, order 1000 begins with the appropriate XML version statement (statement 1002). Next, order 1000 includes DOCTYPE statement 1005, which identifies the correct DTD to the XML parser (XML Parser 150 in this case). The DOCTYPE statement is followed by ORDER tag 1007, which signals the beginning of an MDML order. TIMESTAMP tag 1010 serves the same purpose as described above. VEHID tag 1015 is used to uniquely identify a particular vehicle. For example, in this particular order the vehicle is a 1997, tan, Ford truck and the random key generated by Customer Device 200 is the number 2175. PYMT tag 1017 is used to identify the form of payment chosen by the customer. Here the data associated with PYMT tag 1017 indicates that the customer wants to pay for this order with a credit card. Another option would be for the customer to indicate cash as a preference and pay for the order at the time the order is picked up. Following PYMT tag 1017 is the actual order itself. Here the customer is ordering two Sausage-Egg sandwiches, a small Hashbrowns, and a milk (see ITEM tags 1020, 1025, and 1030).

Physical Environment—Existing Systems

For the purposes of compatibility, the mechanisms of the preferred embodiment can function in conjunction with existing drive-up window technology or in lieu of such technology. Customers who do not have a device capable of functioning as Customer Device 200 or who simply prefer to use an existing two-way speaker configuration are not precluded from doing so by the mechanisms of the preferred embodiment. Indeed, the display used to display vehicle identification and order information (see block 540 of FIG. 5) would simply display information regarding both types of orders (i.e., electronic and nonelectronic) to the restaurant staff. In another embodiment of the present invention, the transmitter of Server 100 could be located at a first location and the receiver of Server 100 could be located at a second location, perhaps at an existing order station (i.e., the location of the existing two-way speaker), such that orders would naturally be queued in a manner similar to that of current drive-up window configurations. While this latter embodiment would be less general, it would eliminate the complexity associated with ensuring that the correct Customer Device 200 processes transmitted rejection and acceptance information. Another possible embodiment of the present invention is the use of Customer Device 200 to transmit orders as described above, but to have the order filled at a walk-up station or window instead of at a drive-up window as is contemplated in the primary embodiment. In this latter embodiment, the acceptance information transmitted by Server 100 (see block 525 of FIG. 5) would comprise an order number that would be used when picking up one's order.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A method for servicing a customer of a restaurant, said method being carried out by a first computer system and comprising the steps of:
    transmitting, from said first computer system, a restaurant menu of said restaurant, said restaurant menu specifying a plurality of available items, each available item of said plurality of available items comprising at least one respective food item or drink item offered for sale by said restaurant for purchase by customers thereof, said restaurant menu being transmitted as a first wireless transmission without being requested by a customer device associated with said customer;
    retransmitting, from said first computer system, said restaurant menu specifying said plurality of available items, said restaurant menu being retransmitted as a second wireless transmission without being requested by said customer device; and
    receiving at said first computer system order information from said customer device, said order information specifying at least one available item selected by said customer for purchase from among said plurality of available items responsive to receiving said restaurant menu in said customer device via said second wireless transmission, said customer device being moved by said customer from a first position to a second position, wherein said first position is not within range of said first wireless transmission and wherein said second position is within range of said second wireless transmission, said order information being received from said customer device as a third wireless transmission after said customer device is moved to said second position, said order information not being received as a result of a request from said customer device; and
    responsive to receiving at said first computer system said order information, displaying, by said first computer system, information to staff of said restaurant to cause the at least one available item selected by said customer for purchase to be prepared by the staff.

2. The method of claim 1 including the step of displaying said item information.

3. The method of claim 1 wherein said first computer system is embodied as a server computer system.

4. The method of claim 1 wherein said order information includes payment information.

5. The method of claim 1 wherein said order information includes vehicle identification information.

6. The method of claim 1 further including the steps of:
    validating said order information;
    accepting said order information when said order information is valid; and
    rejecting said order information when said order information is not valid.

7. The method of claim 6 further including the steps of:
    transmitting acceptance information to said client device when said order is valid; and
    transmitting error information to said client device when said order is not valid.

8. The method of claim 1 including the step of displaying said order information.

9. The method of claim 5 including the step of displaying said vehicle identification information.

10. A method for servicing a customer of a restaurant, said method being carried out by a customer device associated with said customer and comprising the steps of:
    receiving a restaurant menu of said restaurant at said customer device via a retransmitted wireless transmission, said restaurant menu comprising information specifying a plurality of available items, each available item of said plurality of available items comprising at least one respective food item or drink item offered for sale by said restaurant for purchase by customers thereof, said retransmitted wireless transmission having been transmitted by a server computer system subsequent to transmitting at least one previous wireless transmission without being requested by said customer device;

displaying said restaurant menu via said customer device subsequent to receipt by said customer device of said retransmitted wireless transmission, said receipt by said customer device of said retransmitted wireless transmission occurring after said customer device is moved by said customer from a first position to a second position, wherein said first position is not within range of said at least one previous wireless transmission and wherein said second position is within range of said retransmitted wireless transmission;

responsive to displaying said restaurant menu via said customer device, receiving, in said customer device, input from said customer specifying at least one available item to be purchased by said customer from among said plurality of available items; and transmitting order information via a wireless transmission from said customer device to said server computer system, said order information specifying said at least one available item to be purchased by said customer, wherein responsive to receiving said order information in said server computer system, said server computer system causes staff of said restaurant to prepare the at least one available item to be purchased by said customer.

11. The method of claim 10 wherein said restaurant menu is repeatedly transmitted such that repeated wireless transmissions result and wherein said repeated wireless transmissions comprise said at least one previous wireless transmission and said retransmitted wireless transmission.

12. The method of claim 10 wherein said order information includes payment information.

13. The method of claim 10 wherein said order information includes vehicle identification information.

14. The method of claim 10 further including the steps of:
receiving acceptance information at said client device after said server computer system determines that said order is valid; and
receiving error information at said client device after said server computer system determines that said order is not valid.

15. The method of claim 10 including the step of displaying said order information.

16. The method of claim 13 including the step of displaying said vehicle identification information.

17. A program product, said program product comprising:
a recordable non-transitory signal bearing medium; and
one or more programs stored on said recordable non-transitory signal bearing medium, said one or more programs being configured to perform the following steps:
transmitting a restaurant menu of a restaurant, said restaurant menu specifying a plurality of available items, each available item of said plurality of available items comprising at least one respective food item or drink item offered for sale by said restaurant for purchase by customers thereof, said restaurant menu being transmitted as a first wireless transmission without being requested by a customer device associated with a customer;
retransmitting said restaurant menu specifying said plurality of available items, said restaurant menu being retransmitted as a second wireless transmission without being requested by said customer device; and
receiving order information from said customer device, said order information specifying at least one available item selected by said customer for purchase from among said plurality of available items responsive to receiving said restaurant menu in said customer device via said second wireless transmission, said customer device being moved by said customer from a first position to a second position, wherein said first position is not within range of said first wireless transmission and wherein said second position is within range of said second wireless transmission, said order information being received as a wireless transmission from said customer device after said customer device is moved to said second position, said order information not being received as the result of a request by said customer device; and
responsive to receiving said order information from said customer device, displaying information to staff of said restaurant to cause the at least one available item selected by said customer for purchase to be prepared by the staff.

18. The program product of claim 17 wherein said order information includes payment information.

19. The program product of claim 17 wherein said order information includes vehicle identification information.

20. The program product of claim 17 wherein said one or more programs are further configured to perform the steps of:
validating said order information;
accepting said order information when said order information is valid; and
rejecting said order information when said order information is not valid.

21. The program product of claim 20 wherein said one or more programs are further configured to perform the steps of:
transmitting acceptance information to said client device when said order is valid; and
transmitting error information to said client device when said order is not valid.

22. The program product of claim 17 wherein said one or more programs are further configured to perform the step of displaying said order information.

23. The program product of claim 19 wherein said one or more programs are further configured to perform the step of displaying said vehicle identification information.

24. A program product for servicing a customer of a restaurant, said program product comprising:
non-transitory signal bearing media; and
one or more programs disposed on said non-transitory signal bearing media, said one or more programs being configured to perform the steps of:
receiving a restaurant menu of said restaurant at a customer device associated with said customer via a retransmitted wireless transmission, said restaurant menu comprising information specifying a plurality of available items, each available item of said plurality of available items comprising at least one respective food item or drink item offered for sale by said restaurant for purchase by customers thereof, said retransmitted wireless transmission having been transmitted by a server computer system subsequent to transmitting at least one previous wireless transmission without being requested by said customer device;

displaying said restaurant menu via said customer device subsequent to receipt by said customer device of said retransmitted wireless transmission, said receipt by said customer device of said retransmitted wireless transmission occurring after said customer device is moved by a said customer from a first position to a second position, wherein said first position is not within range of said at least one previous wireless transmission and wherein said second position is within range of said retransmitted wireless transmission;

responsive to displaying said restaurant menu via said customer device, receiving, in said customer device, input from said customer specifying at least one available item to be purchased by said customer from among said plurality of available items; and transmitting order information via a wireless transmission from said customer device to said server computer system, said order information specifying said at least one available item to be purchased by said customer, wherein responsive to receiving said order information in said server computer system, said server computer system causes staff of said restaurant to prepare the at least one available item to be purchased by said customer.

25. The program product of claim 24 wherein said restaurant menu is repeatedly transmitted such that repeated wireless transmissions result and wherein said repeated wireless transmissions comprise said at least one previous wireless transmission and said retransmitted wireless transmission.

26. The program product of claim 24 wherein said order information includes payment information.

27. The program product of claim 24 wherein said order information includes vehicle identification information.

28. The program product of claim 24 wherein said one or more programs are further configured to perform the steps of:
receiving acceptance information at said client device after it is determined that said order is valid; and
receiving error information at said client device after it is determined that said order is not valid.

29. The program product of claim 24 wherein said one or more programs are further configured to perform the steps of displaying said order information.

30. The program product of claim 27 wherein said one or more programs are further configured to perform the steps of displaying said vehicle identification information.

31. An apparatus for servicing a customer of a restaurant, said apparatus comprising:
a processor;
memory connected to said processor;
a mechanism for repeatedly transmitting a restaurant menu of said restaurant via an outbound wireless transmission, said restaurant menu comprising information specifying a plurality of available items, each available item of said plurality of available items comprising at least one respective food item or drink item offered for sale by said restaurant for purchase by customers thereof, said restaurant menu being repeatedly transmitted without being requested by a customer device associated with said customer, wherein said outbound wireless transmission is designed to be received by said customer device responsive to said customer device being moved by said customer from an out of range location to a location that is within range of said outbound wireless transmission; and
a mechanism for receiving order information via an inbound wireless transmission from said customer device, said order information specifying at least one available item selected by said customer for purchase from among said plurality of available items responsive to receiving said restaurant menu in said customer device via said outbound wireless transmission; and
a mechanism for displaying information to staff of said restaurant to cause the at least one available item selected by said customer for purchase to be prepared by the staff responsive to receiving said order information via an inbound wireless transmission from said customer device.

32. A customer device, said customer device comprising:
a processor;
memory connected to said processor;
a mechanism for receiving a repeatedly transmitted wireless transmission regarding a restaurant menu of a restaurant from a server computer system of said restaurant, said restaurant menu comprising information specifying a plurality of available items, each available item of said plurality of available items comprising at least one respective food item or drink item offered for sale by said restaurant for purchase by customers thereof, said transmission being received when in range of said transmission, but not when outside of said range of said transmission and not as the result of a request for said restaurant menu;
a mechanism for displaying said restaurant menu subsequent to receipt by said customer device of said restaurant menu when said customer device is moved from an out of range location to a location that is within range of said transmission;
a mechanism for receiving input from a customer associated with said customer device specifying at least one available item to be purchased by said customer from among said plurality of available items; and
a mechanism for transmitting order information via a wireless transmission from said customer device to said server computer system, said order information specifying said at least one available item to be purchased by said customer, wherein responsive to receiving said order information in said server computer system, said server computer system causes staff of said restaurant to prepare the at least one available item to be purchased by said customer.

33. The mechanism of claims 31 or 32 in which said mechanism is a suitably configured program stored in said memory.

34. A method for drive-through order processing in a restaurant, comprising the steps of:
repeatedly broadcasting, via a limited range wireless transmission from a server computer system of said restaurant, a restaurant menu of said restaurant, said restaurant menu specifying a plurality of available items, each available item of said plurality of available items comprising at least one respective food item or drink item offered for sale by said restaurant for purchase by customers at a drive-through window thereof, said restaurant menu being broadcast without being requested by a customer of said restaurant;
responsive to repeatedly broadcasting said restaurant menu, receiving said restaurant menu in each of a plurality of mobile customer devices and displaying said menu to a respective customer associated with each said mobile customer device, each mobile customer device being within a vehicle carrying the respective customer associated with the respective mobile customer device, each mobile customer device receiving said restaurant menu as the respective vehicle within which it is contained comes within range of said limited range wireless transmission;

responsive to displaying said menu to a respective customer associated with each said motile customer device, receiving, in each said mobile customer device, respective input from the respective customer specifying at least one available item to be purchased by the respective customer from among said plurality of available items;

responsive to receiving, in each said mobile customer device, respective input from the respective customer specifying a respective at least one available item to be purchased, receiving, in said server computer system, respective order information wirelessly transmitted from the respective mobile customer device, the respective order information specifying the at least one available item selected by the respective customer for purchase; and responsive to receiving, in said server computer system, respective order information, displaying with said server computer system information to staff of said restaurant to cause the respective at least one available item specified by the respective order information to be prepared by the staff.

* * * * *